(12) United States Patent
Wong et al.

(10) Patent No.: US 7,481,990 B2
(45) Date of Patent: Jan. 27, 2009

(54) METHODS FOR OSMYLATING AND RUTHENYLATING SINGLE-WALLED CARBON NANOTUBES

(75) Inventors: Stanislaus S. Wong, Middle Island, NY (US); Sarbajit Banerjee, Stony Brook, NY (US)

(73) Assignee: The Research Foundation of State University of New York, Albany, NY (US)

(*) Notice: Subject to any disclaimer, the term of this patent is extended or adjusted under 35 U.S.C. 154(b) by 384 days.

(21) Appl. No.: 11/045,808

(22) Filed: Jan. 27, 2005

(65) Prior Publication Data

US 2006/0165586 A1 Jul. 27, 2006

(51) Int. Cl.
*B05D 1/18* (2006.01)
*C09C 1/44* (2006.01)
*D01F 9/12* (2006.01)

(52) U.S. Cl. .................. 423/460; 423/461; 423/447.1; 977/748; 977/751; 977/847; 977/892; 427/430.1; 427/443.2; 427/903

(58) Field of Classification Search .............. 423/447.5, 423/461, 460, 447.1; 977/748, 751, 847, 977/892; 427/430.1, 443.2, 903
See application file for complete search history.

(56) References Cited

OTHER PUBLICATIONS

Enzo Menna, Federico Della Negra, Michela Dalla Fontana, and Moreno Meneghetti, "Selectivity of chemical oxidation attack of single-wall carbon nanotubes in solution," Physical Review B 68, 2003, 193412(R).*
Collins et al., *Science* 2001, 292:706-709.
Krupke et al., *Science* 2003, 301:344-347.
Chen et al., *Nano Lett.* 2003, 3(9):1245-1249.
Chattopadhyay et al., *J. Am. Chem. Soc.* 2003, 125:3370-3375.
Strano, M. S., *J. Am. Chem. Soc.* 2003, 125:16148-16153.
Strano et al., *Science* 2003, 301:1519-1522.
Schröder, M., *Chem. Rev.* 1980, 80:187-213.
Sharpless, K.B. *Angew. Chem., Int. Ed.* 2002, 41:2024-2032.
Hawkins et al., *J. Org. Chem.* 1990, 55:6250-6252.
Hawkins, J.M., *Acc. Chem. Res.* 1992, 25:105-156.
Hawkins et al., *Science* 1991, 252:312-313.
Hawkins, J.M., *Science* 1993, 260: 1918-1920.
Lu et al., *Nano Lett.* 2002, 2(11):1325-1327.
Cui et al., *Nano Lett.* 2003, 3(5):613-615.
Hwang, K.C., *J. Chem. Soc., Chem. Commun.* 1995, 173-174.

* cited by examiner

*Primary Examiner*—Ngoc-Yen M Nguyen
*Assistant Examiner*—Diana J Liao
(74) *Attorney, Agent, or Firm*—Hoffman & Baron, LLP

(57) ABSTRACT

The present invention provides a method of differentiating metallic carbon nanotubes from semiconducting carbon nanotubes. The method comprising providing a nanotube dispersion, wherein the nanotube dispersion comprises a plurality of carbon nanotubes, osmium tetroxide, or ruthenium tetroxide, and a solvent; and irradiating the nanotube dispersion with ultraviolet light, wherein the metallic carbon nanotubes are osmylated, or ruthenylated, thereby differentiating the metallic carbon nanotubes from the semiconducting carbon nanotubes.

16 Claims, 12 Drawing Sheets

Binding Energy (eV)

Binding Energy (eV)

Binding Energy (eV)

Binding Energy (eV)

METHODS FOR OSMYLATING AND RUTHENYLATING SINGLE-WALLED CARBON NANOTUBES

BACKGROUND OF THE INVENTION

The present invention relates to the art of nanotechnology, and in particular, to carbon nanotube technology, its function and structure.

A carbon nanotube is a single graphene sheet in the form of a seamless cylinder. The ends of a nanotube typically have hemispherical caps. The typical diameter of a nanotube ranges from about 1 nm to 10 nm. The length of a nanotube potentially can be millions of times greater than its diameter.

Carbon nanotubes are comprised of shells of $sp^2$-hybridized carbon atoms forming a hexagonal network that is itself arranged helically within the cylinder. Basically, helicity is the arrangement of the carbon hexagonal rings with respect to a defined axis of a tube. (M. S. Dresselhaus et al "Science of Fullerenes and Carbon Nanotubes" (Academic Press, New York, 1996)).

Carbon nanotubes are grown by combining a source of carbon with a catalytic nanostructured material such as iron or cobalt at elevated temperatures. At such temperatures, the catalyst has a high solubility for carbon. The carbon links up to form graphene and wraps around the catalyst to form a cylinder. Subsequent growth occurs from the further addition of carbon.

Since their discovery in the early 1990s, carbon nanotubes have been the focus of intense study due to their very desirable and unique combination of physical properties. They are chemically inert, thermally stable, highly strong, lightweight, flexible and electrically conductive. In fact, carbon nanotubes may potentially be stiffer and stronger than any other known material.

Carbon nanotubes are currently being proposed for numerous applications, such as, for example, catalyst supports in heterogeneous catalysis, high strength engineering fibers, sensory devices and molecular wires for the next generation of electronics devices.

There has been particularly intense study of the electrical properties of nanotubes, and their potential applications in electronics. Metallic carbon nanotubes have conductivities and current densities that meet or exceed the best metals; and semiconducting carbon nanotubes have mobilities and transconductance that meet or exceed the best semiconductors.

The physical properties of carbon nanotubes are structure-dependent. For example, depending on the diameter and helicity of a nanotube, the tube can be either metallic or semiconducting. Also, a single structural defect in a hexagonal ring can change a metallic nanotube to a semiconducting nanotube. Current methods for producing nanotubes results in a mixture of tubes with diverse diameters, helicities and structural defects. Thus, a mixture of metallic and semiconducting nanotubes are produced.

Separation of single-walled carbon nanotubes (SWNTs), according to their electronic properties, is essential to the development of molecular electronics, including field-effect transistors.

Techniques have recently been reported by which separation based on electronic properties, i.e., chiral separations, of SWNTs has been achieved. These techniques are associated with (i) alternating current dielectrophoresis and (ii) the current-induced oxidation of metallic nanotubes. (Collins et al., Science 2001, 292, 706; Krupke et al., Science 2003, 301, 344.) However, these techniques require individualization of nanotubes in order to evaluate their electronic properties, i.e., these methods cannot be applied to bulk samples. Instead, individual nanotubes have to be placed one by one between electrodes in a transistor geometry.

Noncovalent and covalent sidewall chemistry to probe differential reactivity in metallic and semiconducting nanotubes has been used to effect the bulk separation of nanotubes. (Chen et al., Nano Lett. 2003, 3, 1245; Chattopadhyay et al. J. Am. Chem. Soc. 2003, 125, 3370; Strano, M. S. J. Am. Chem. Soc. 2003, 125, 16148; Strano et al. Science 2003, 301, 1519.) However, such noncovalent methods are not efficient; and such covalent methods require nanotubes to be individualized.

Accordingly, there remains a need for a simple and efficient method of differentiating between semiconducting and metallic SWNTs which does not require individualization of SWNTs, i.e., which can be performed in bulk

SUMMARY OF THE INVENTION

The present invention provides osmylation, or ruthenylation, of single-walled carbon nanotubes by a chemical reaction, i.e., solution-phase osmylation, or solution phase ruthenylation, and applications of these reactions.

In one embodiment, a method of differentiating metallic carbon nanotubes from semiconducting carbon nanotubes is provided. The method comprises providing a nanotube dispersion, wherein the nanotube dispersion comprises a plurality of carbon nanotubes, osmium tetroxide and a solvent. The nanotube dispersion is irradiating the nanotube dispersion with ultraviolet light, wherein the metallic carbon nanotubes are osmylated thereby differentiating the metallic carbon nanotubes from the semiconducting carbon nanotubes.

Preferably, the wavelength of the ultraviolet light is between approximately 100 to 400 nm, more preferably, 254 nm. The time for irradiation is at least about three or five minutes. Preferably, the amount of the osmium tetroxide exceeds the amount of the nanotubes by a ratio of at least about 3:1. Preferably, the nanotubes in the nanotube dispersion are individualized before osmylation.

In another aspect of this embodiment, the method further comprises separating the osmylated metallic carbon nanotubes from semiconducting carbon nanotubes based on density.

In another embodiment of the invention, method of silencing metallic carbon nanotubes in a nanotube device is provided. The method comprises providing a nanotube device which comprises a plurality of carbon nanotubes. The device is exposed to osmium tetroxide and a solvent; and irradiated with ultraviolet light, wherein the metallic carbon nanotubes are osmylated thereby silencing the metallic carbon nanotubes.

Preferably, the wavelength of the ultraviolet light is between approximately 100 to 400 nm, more preferably, 254 nm. The time for irradiation is at least about three or five minutes. Preferably, the amount of the osmium tetroxide exceeds the amount of the nanotubes by a ratio of at least about 3:1. Preferably, the nanotubes in the nanotube dispersion are individualized before osmylation.

In another embodiment of the invention, a method of aggregating carbon nanotubes is provided. The method comprises providing a nanotube dispersion, wherein the nanotube dispersion comprises a plurality of carbon nanotubes, osmium tetroxide and a solvent. The dispersion is irradiated with ultraviolet light until the carbon nanotubes aggregate.

In another embodiment, an osmylated metallic carbon nanotube comprising a metallic nanotube with osmium dioxide covalently attached to at least 5% of the side wall carbons is provided. Preferably, the osmylated metallic carbon nanotube has osmium dioxide covalently attached to at least 15% of the side wall carbons.

In another embodiment, a method of differentiating metallic carbon nanotubes from semiconducting carbon nanotubes is provided. The method comprises providing a nanotube dispersion, wherein the nanotube dispersion comprises a plurality of carbon nanotubes, ruthenium tetroxide and a solvent. The nanotube dispersion is irradiating the nanotube dispersion with ultraviolet light, wherein the metallic carbon nanotubes are ruthenylated thereby differentiating the metallic carbon nanotubes from the semiconducting carbon nanotubes.

Preferably, the wavelength of the ultraviolet light is between approximately 100 to 400 nm, more preferably, 254 nm. The time for irradiation is at least about three or five minutes. Preferably, the amount of the osmium tetroxide exceeds the amount of the nanotubes by a ratio of at least about 3:1. Preferably, the nanotubes in the nanotube dispersion are individualized before ruthenylation.

In another aspect of this embodiment, the method further comprises separating the ruthenylated metallic carbon nanotubes from semiconducting carbon nanotubes based on density.

In another embodiment of the invention, method of silencing metallic carbon nanotubes in a nanotube device is provided. The method comprises providing a nanotube device which comprises a plurality of carbon nanotubes. The device is exposed to ruthenium tetroxide and a solvent; and irradiated with ultraviolet light, wherein the metallic carbon nanotubes are ruthenylated thereby silencing the metallic carbon nanotubes.

Preferably, the wavelength of the ultraviolet light is between approximately 100 to 400 nm, more preferably, 254 nm. The time for irradiation is at least about three or five minutes. Preferably, the amount of the ruthenium tetroxide exceeds the amount of the nanotubes by a ratio of at least about 3:1. Preferably, the nanotubes in the nanotube dispersion are individualized before ruthenylation.

In another embodiment of the invention, a method of aggregating carbon nanotubes is provided. The method comprises providing a nanotube dispersion, wherein the nanotube dispersion comprises a plurality of carbon nanotubes, ruthenium tetroxide and a solvent. The dispersion is irradiated with ultraviolet light until the carbon nanotubes aggregate.

In another embodiment, an ruthenylated metallic carbon nanotube comprising a metallic nanotube with ruthenium dioxide covalently attached to at least 5% of the side wall carbons is provided. Preferably, the ruthenylated metallic carbon nanotube has osmium dioxide covalently attached to at least 15% of the side wall carbons.

For a better understanding of the present invention, reference is made to the following description, taken in conjunction with the accompanying drawings, and the scope of the invention set forth in the claims.

DETAILED DESCRIPTION OF THE INVENTION

Figure 1A:
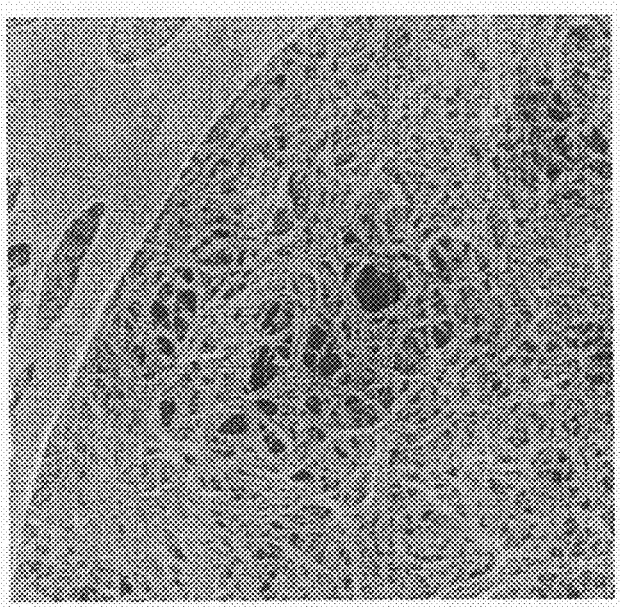
FIG. 1A. Scanning electron micrograph of purified HiPco SWNTs. Scale bar represents 400 nm.

The present invention includes methods of differentiating and separating metallic carbon nanotubes from semiconducting carbon nanotubes in bulk; and includes methods of making nanotube devices comprising single-walled carbon nanotubes.

Carbon nanotubes can be prepared by methods known in the art. For example, carbon nanotubes can be prepared by the laser vaporization. (Thess et al. *Science* 273: 483 (1996)). Also, carbon nanotubes can be prepared by arc discharge (Ishigami, M. et al. *Chem. Phys. Lett.* 319:457 (2000); Su, M. et al. *Chem. Phys. Lett.* 322:321 (2000); Journet, C. et al. *Nature* 388:756 (1997); Colbert et al. *Science* 266:1218, (1994)); Shi, Z. et al. *Carbon* 37:1449 (1999) and Ebbeson, T. et al. *Nature* 358:220 (1992)). The carbon nanotubes can be prepared by catalytic chemical vapor deposition (Kukovitsky, E. F. et al. *Chem. Phys. Lett.* 317.65 (2000); Su, M. et al. *Chem. Phys. Lett.* 322:321 (2000); Li et al. *Science* 274:1701 (1996); and Pan, Z. et al. *Chem. Phys. Lett.* 299:97 (1999)). Alternatively, carbon nanotubes can be provided from an outside source The carbon nanotubes may optionally be doped with other elements, for example, with metals, such as boron or nitrogen; or gases, such as ammonia and oxygen, by methods known in the art. Additionally, the carbon nanotubes can optionally be shortened. Techniques by which to shorten nanotubes include acid etching, ion beam milling, ball milling, and gas etching.

Preferably, the carbon nanotubes are purified. Purification can be effected by methods known in the art. For example, nanotubes can be purified by mild oxidation in wet air followed by treatment with HCl, copious washing with water, and drying at high temperature. Such a method of purification is preferred for HiPCO tubes. (Bahr et al., *Chem. Mater.* 2001, 13, 3823.) Alternatively, SWNT bundles can be oxidized according to existing procedures involving acidic potassium permanganate solution and hydrochloric acid. See for example Hiura et al. *Adv. Mater* 7:275 (1995). Also, SWNT samples can be prepared via arc discharge, pulsed laser vaporization, or chemical vapor deposition. The SWNT samples can be purified by sonication and filtration through 0.8 micron pore membranes. See for example, Bonard et al. *Adv. Mat.*, 9:827 (1997), K. Tohji et al. *J. Phys. Chem. B,* 101:1974 (1997), and K. Tohji et al., *Nature,* 383:679 (1996).

The methods of the invention apply to single-walled nanotubes (SWNTs). A SWNT comprises only one nanotube. SWNTs typically have a diameter of about 0.7 to about 2.5 nm, and a length of up to about one mm. SWNTs are typically produced in bundles. A bundle comprises a plurality of SWNTs. The diameter of a bundle of SWNTs is typically about 10 to 20 nm. The bundles can be exfoliated.

Preferably, the carbon nanotubes, prepared in bulk, are individualized. Since raw carbon nanotubes are essentially insoluble, the solubility of nanotubes can be increased and nanotubes exfoliated, i.e., individualized, by methods known in the art. For example, U.S. patent application Ser. No. 10/615,492, entitled "Carbon Nanotube Adducts and Methods of Making the Same" describes such methods, e.g., derivatization of nanotubes with transitional metal coordination complexes and with macrocyclic molecules. The application is incorporated herein by reference in its entirety. Another method of individualizing nanotubes is by micelle-coating nanotubes with sodiumdodecyl sulfate (O'Connell et al., *Science* 297:593 (2002)).

Other methods of increasing the solubility of nanotubes are, for example, by derivatization with thionyl chloride and octadecylamine (Chen et al. *Science* 282:95 (1998)), derivatization with poly(propionylethylenimine-co-ethylenimine) (Riggs et al. *J. Am. Chem. Soc.* 122:5879 (2000)), derivatization with fluorine and alkanes (Boul et al. *Chem. Phys. Lett.* 310:367 (1999)), derivatization glucosamine and gum arabic (Bandyopadhyaya et al. *Nano Lett.* 2:25 (2002)).

After the nanotubes are individualized by the aforementioned methods, the individualized nanotubes are preferably recovered from solution. The individualized nanotubes can be recovered in bulk form, or individual nanotubes can be isolated.

In one embodiment of the invention, nanotubes in bulk are exposed to osmium in the solution phase at room temperature. The nanotubes are mixed with an excess of osmium tetroxide ($OsO_4$) to form a nanotube/$OsO_4$ mixture.

In another embodiment, nanotubes in bulk are exposed to ruthenium in the solution phase at room temperature. The nanotubes are mixed with an excess of ruthenium tetroxide ($RuO_4$) to form a nanotube/$RuO_4$ mixture.

The ratio by weight of $OsO_4$ to nanotubes, or the ratio by weight of $RuO_4$ to nanotubes, is at least approximately 2:1, 3:1, 4:1, 5:1, 6:1, 7:1, 8:1, 9:1, 10:1, 11:1, 12:1, or 13:1. There is no necessary maximum ratio. Some examples of maximum ratios include approximately 14:1, 15:1, 16:1, 17:1, 18:1, 19:1, 20:1, and 25:1.

A solvent is added to the nanotube/$OsO_4$ mixture, or to the to the nanotube/$RuO_4$ mixture, to form a carbon nanotube dispersion. The amount of solvent necessary to form a dispersion would be known by a skilled artisan. The solvent can be any solvent that does not coordinate to or react with osmium or ruthenium, e.g., a nonpolar solvent. Examples of suitable solvents include xylenes, methanol, ethanol, 2-propanol, acetone, o-dichlorobenzene (ODCB), ethyl acetate, benzene, hexanes, and octadecene. The dispersion is preferably sonicated.

The whole dispersion, or a portion of the dispersion, is irradiated with ultraviolet light at room temperature. Preferably, the wavelength of the ultraviolet light is between approximately 200 and 270 nm. An example of a suitable wavelength is 254 nm. Preferably, wavelengths other than the selected wavelength are blocked out. For example, a bandpass filter can be used at 254 nm to block out other wavelengths. Preferably, mixtures are stirred during irradiation. Preferably, before irradiation, the dispersion is filtered, and washed with ample quantities of one of the aforementioned solvents.

Ultraviolet irradiation allows for nanoparticulate templating (i.e., coating) of osmium, or ruthenium, onto the metallic nanotube surfaces. In particular, the metallic nanotubes are selectively templated by osmium or ruthenium. The semiconducting nanotubes in the dispersion remain virtually uncoated. The osmium which coats the nanotubes is almost exclusively in the $OsO_2$ form; and the ruthenium is almost exclusively in the $RuO_2$ form. The time of irradiation correlates with the density of the osmium, or ruthenium, coating. That is, as the time of irradiation is increased, the denser the coating becomes, provided that a sufficient amount of osmium tetroxide, or ruthenium tetroxide, is supplied.

Accordingly, the time for irradiation is adjusted depending upon the density of the coating desired and the size of the nanotube dispersion. For example, irradiation can last for at least about 2 minutes, 5 minutes, 10 minutes, 20 minutes, 30 minutes, 45 minutes, 60 minutes, 80 minutes, 100 minutes, 120 minutes, 130 minutes, or at least about 150 minutes. There is no necessary maximum amount of time for irradiation. Some examples of maximum time limits include approximately, about 180 minutes, 200 minutes, and 220 minutes.

Additionally, by adjusting the conditions for osmylation, or ruthenylation, certain diameters of the metallic tubes are preferentially osmylated or ruthenylated. In particular, smaller diameter metallic nanotubes, because of increased strain, are more susceptible to osmylation, or ruthenylation. Thus, such separation requires the use of a limited amount of $OsO_4$ or $RuO_4$, and a shorter period of irradiation. For example, to osmylate or ruthenylate smaller diameter tubes, the ratio by weight of $OsO_4$ to nanotubes, or the ratio by weight of $RuO_4$ to nanotubes, is about 2:1. For further selectivity irradiation takes place for about two minutes to select nanotubes <0.7 nm in diameter; about 5 minutes for nanotubes<0.9 nm in diameter, and 15 minutes for nanotubes<1 nm in diameter. (An example of diameter selectivity is described in U.S. patent application Ser. No. 10/701,402, entitled "Sidewall-Functionalized Carbon Nanotubes, and Methods for Making the Same." The application is incorporated herein by reference in its entirety.)

Methods of Differentiating and/or Separating Semiconducting Nanotubes from Metallic Nanotubes Formed in Bulk In one embodiment of the invention, metallic and semiconducting nanotubes formed in bulk are differentiated from one another. In this embodiment, preliminary individualization of nanotubes, as described above, is preferred.

Nanotubes in the dispersion which are metallic are selectively templated with osmium or ruthenium (i.e., osmylated or ruthenylated) by the methods described above. For the purposes of differentiation, as little as approximately 5% to 15% of the side wall carbons of the metallic nanotubes can have osmium dioxide, or ruthenium dioxide, covalently attached. Accordingly, the time of irradiation is in the shorter end of the range. For example, irradiation can take place for as little as about three minutes to about fifteen minutes, e.g., about five minutes (adjusting for the size of the dispersion, as would be known by a skilled artisan).

Alternatively, irradiation can continue until $OsO_2$ nanoparticles, or $RuO_2$ nanoparticles, thoroughly cover the metallic nanotube sidewalls. For example, up to approximately 50% of the side wall carbons of the metallic nanotubes can have osmium dioxide, or ruthenium dioxide, covalently attached. Accordingly, the time of irradiation is in the relatively longer. For example, irradiation can take place for about thirty to sixty minutes (adjusting for the size of the dispersion, as would be known by a skilled artisan).

In addition to differentiating between metallic and semi-conducting nanotubes, in a further aspect, metallic nanotubes are separated from semiconducting nanotubes. Since metallic nanotubes with attached $OsO_2$ or $RuO_2$ nanoparticles are denser than uncoated semiconducting nanotubes, separation can be based on density. For example, the osmylated, or ruthenylated dispersion can be centrifuged, whereby the denser metallic nanotubes are pulled in the direction of the centrifugal force (Chen et al., *Nano. Lett.* 2003, 3, 1245).

Methods of Aggregating Nanotubes

In another embodiment of the invention, irradiation of a nanotube dispersion, as defined above, is continued for a period of time which allows for a more extensive osmylation or ruthenylation.

For example, in addition to allowing $OsO_2$ nanoparticles to thoroughly cover the metallic nanotube sidewalls, irradiation can continue until $OsO_2$ nanoparticles, and/or amorphous $OsO_2$, or $RuO_2$ nanoparticles, and/or amorphous $RuO_2$, become deposited inside bundles of tubes and in the interstitial channels between tubes. If irradiation continues after such a point, $OsO_2$ nanoparticles and/or amorphous $OsO_2$, or $RuO_2$ nanoparticles and/or amorphous $RuO_2$, aggregate nanotubes into bundles. Further irradiation then allows for multiple bundles to aggregate. Aggregations can range in size from about tens of nanometers to tens of microns.

Both crystalline $OsO_2$ nanoparticles and amorphous $OsO_2$, or both crystalline $RuO_2$ nanoparticles and/or amorphous $RuO_2$, form between the nanotubes and between the bundles. Since amorphous $OsO_2$ and amorphous $RuO_2$ are highly metallic, they act like a "metallic glue" or solder.

The aggregation of nanotubes allows for the formation supramolecular nanostructures, i.e., nanoscale assemblies. These assemblies comprise a plurality of carbon nanotubes and a plurality of uncoated nanotubes adjoined by osmium dioxide or ruthenium oxide. Depending upon the particular application, the assembly can comprise osmium dioxide adjoining coated and uncoated nanotubes, and/or adjoining coated nanotubes, and/or adjoining uncoated nanotubes; or the assembly can comprise ruthenium dioxide adjoining coated and uncoated nanotubes, and/or adjoining coated nanotubes, and/or adjoining uncoated nanotubes.

Examples of nanoscale assemblies include sensors, devices used in molecular electronics; solar cells; devices used in optoelectronics, e.g., field emitters; devices used in nanocatalysis; and scanning microscopy tips.

Osmylated or Ruthenylated Isolated Metallic SWNT

In one embodiment of the invention, the electronic property of an isolated nanotube is determined.

In one aspect of this embodiment, after individualizing nanotubes in bulk, the nanotubes are osmylated or ruthenylated, as described above. Then at least one nanotube is isolated from the dispersion by methods known in the art. The isolated nanotube is then tested to determine whether it is osmylated or ruthenylated. If the isolated nanotube is not osmylated, or not ruthenylated, it is semiconducting.

Alternatively, after individualizing nanotubes in bulk, at least one nanotube is isolated. The isolated nanotube is then exposed to osmium or ruthenium in a solvent as described above. If the isolated nanotube is not osmylated, or not ruthenylated, it is semiconducting.

Osmylation or ruthenylation in the solution phase of an isolated SWNT allows for control of the extent to which the metallic SWNT is osmylated or ruthenylated. As described above, the length of time for irradiation determines what percentage of the side wall carbons of the metallic nanotubes have osmium dioxide, or ruthenium dioxide, covalently attached. For example, approximately 15% to 50% of the side wall carbons of the metallic nanotubes can have osmium dioxide, or ruthenium dioxide, covalently attached. Depending on the extent of coverage desired, the time for irradiation varies between about two to about 220 minutes.

Methods of Making Nanotube Devices

In one embodiment of the invention, methods of making nanotube devices are provided. Nanotube devices comprise a substrate, electrodes and semiconducting nanotubes.

The method comprises growing nanotubes on a substrate, and patterning electrodes over the substrate, as known in the art (Avouris, P. *Acc. Chem. Res.* 35: 1026 (2002); Franklin et al., *Applied Physics Letters* 81 (5): 913-915 (2002); Cao et al., Department of Chemistry and Laboratory for Advanced Materials, Stanford University, Stanford, Calif., Small 1 (1): 138-141 (2005)).

The metallic nanotubes are then silenced by covalently attaching osmium dioxide, or ruthenium dioxide, to the metallic nanotubes, as described above. For the purposes of this specification, the term "silencing" means disabling or eliminating the contribution of, or negating the effect of. For the purposes of silencing metallic nanotubes, as little as approximately 5% to approximately 15% of the side wall carbons of the metallic nanotubes are required to have osmium dioxide, or ruthenium dioxide, covalently attached. Accordingly, in this embodiment, the time for irradiation is a short, for example, as little as about five to ten minutes. Alternatively, irradiation can continue until $OsO_2$ nanoparticles, or $RuO_2$ nanoparticles, thoroughly cover the metallic nanotube sidewalls, as described above.

EXAMPLES

Synthesis of Osmylated Adducts. Raw SWNTs (HiPco, Carbon Nanotechnologies Inc.) were purified by mild oxidation in wet air followed by treatment with HCl, copious washing with water, and drying at high temperature. (Bahr et al. *Chem. Mater.* 2001, 13, 3823.) This treatment is able to remove a significant portion (though not all) of the remnant HiPco iron catalyst.

In the functionalization reaction, 13.5 mg of the purified SWNTs was mixed with a large excess of $OsO_4$ (Aldrich, 184 mg) and dispersed in 10 mL of toluene by brief sonication. Aliquots from this mixture were placed in a quartz cell with a 10 mm path length and irradiated with 254 nm light from a 200 W Hg arc lamp (Oriel instruments). A band-pass filter was used at 254 nm to block out all other wavelengths. Mixtures were irradiated for approximately 2 h with extensive stirring. Workup for the reaction involved filtration over a 0.2 μm PTFE membrane, followed by washing with ample quantities of toluene and methanol. Control experiments involved the systematic elimination of nanotubes, $OsO_4$, or UV irradiation, respectively, from the reaction mixture.

Scanning Electron Microscopy. Samples for SEM were drop dried onto 300 mesh Cu grids covered with lacy carbon film. The grids were placed on a homemade sample holder and held over a Be plate. They were imaged using a Leo 1550 field emission instrument at accelerating voltages from 2 to 10 kV at a working distance of 2 mm. It is of note that all samples, including the functionalized adducts, could be imaged as is, without the need for additional metal sputter coating.

Transmission Electron Microscopy. Samples were drop dried on the grids from solution. Low-resolution images were obtained on a Philips CM12 TEM, equipped with energy-dispersive X-ray spectroscopic (EDS) capabilities at accelerating voltages of 120 kV. High-resolution images were obtained on a JEOL 2010F instrument equipped with an INCA EDS system, at accelerating voltages of 200 kV.

X-ray Photoelectron Spectroscopy. For XPS analyses, the samples were attached to stainless steel holders using conductive double-sided tape, and placed in the vacuum chamber of a Model DS800 XPS surface analysis system (Kratos Analytical Plc, Manchester, UK). The chamber was evacuated to a base pressure of $\sim 5 \times 10^{-9}$ Torr. A hemispherical energy analyzer was used for electron detection. XPS spectra were first collected using a Mg Kα X-ray source at 80 eV pass energy and in 0.75 eV steps. High-resolution spectra were collected at pass energy of 10 eV and in 0.1 eV steps.

Raman Spectroscopy. FT-Raman spectra were obtained on a Brüker instrument on dispersions of nanotubes in DMF or $CS_2$. The Raman data were acquired, after 100-200 scans, upon excitation of a 1064 nm Nd:YAG laser at a power of ~100 mW, using a liquid $N_2$ cooled Ge detector. For Raman microprobe measurements, samples were drop cast onto Si wafers. Spectra were collected at 632.8 nm excitation (He—Ne laser at ~5 mW) and at 514.5 nm (Ar ion laser at 2-3 mW) on a Kaiser Raman and a Reinshaw System 1000 microscope, respectively. The spectra were acquired at resolutions superior to 2 $cm^{-1}$.

Optical Spectroscopy. Samples were dispersed in o-dichlorobenzene (ODCB) or in DMF by mild and brief sonication. Clear solutions were obtained by filtering over glass wool. UV-visible spectra were obtained on a Thermospectronics UV1 instrument using quartz cells with a 10 mm path length at a resolution of 1 nm. FT-near-IR data were obtained on a Nexus 670 (Thermo Nicolet) instrument equipped with a single-reflectance ZnSe ATR accessory, a $CaF_2$ beam splitter, and a InGaAs detector. Samples were placed on a ZnSe crystal. Data were taken at a reproducible pressure.

Results

Figure 1B:
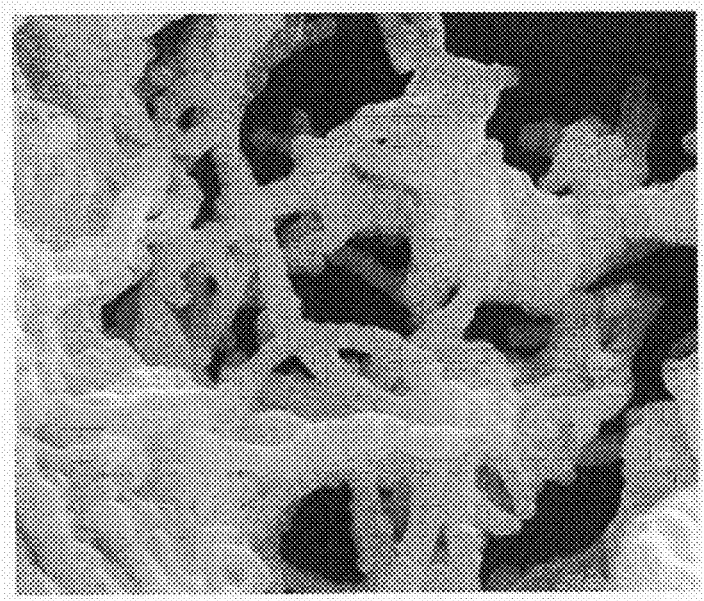
FIG. 1B. Scanning electron micrograph of aggregates of osmium dioxide templated SWNT bundles. Scale bar represents 400 nm.
Figure 1C:
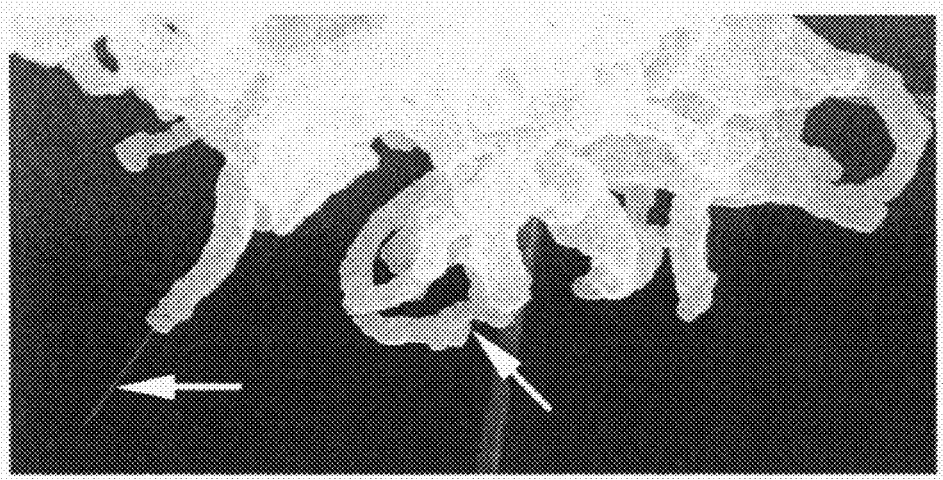
FIG. 1C. Scanning electron micrograph of partially uncoated nanotube bundles protruding from $OsO_2$-coated templated aggregates. Arrows depict nanotube bundles where the metal coating is not completely covering all of the nanotubes. Scale bar represents 400 nm.

Microscopy Characterization. FIG. 1A shows purified HiPco tubes. FIGS. 1B and 1C show SEMs of nanotubes that have been reacted with $OsO_4$. The gross tubular morphology is preserved. However, the tubes are thickly coated with clumps of $OsO_2$. EDS measurements in the SEM showed a strong osmium signal consistent with the expected formation of this coating. These images show that the metal coating is neither sharply faceted nor single crystalline. Sections of single nanotubes or bundles can sometimes be observed where the coating has not completely enveloped the tubes.

These images indicate a different reaction mechanism from prior art nanotube-nanocrystal adduct formation, where isolated, discrete particles have attached at defect sites and ends (Banerjee et al., *Nano Lett.* 2002, 2, 195; Banerjee et al., *J. Am. Chem. Soc.* 2003, 125, 10342; Ravindran et al., *Nano Lett.* 2003, 3, 447; Azamaian et al., *Chem. Commun.* 2002, 366; Harentza et al., *Nano Lett.* 2002, 2, 1253). In this case, there is essentially complete coverage of nanoparticles on the nanotube sidewalls, suggesting their mediation in this reaction.

Figure 2A:
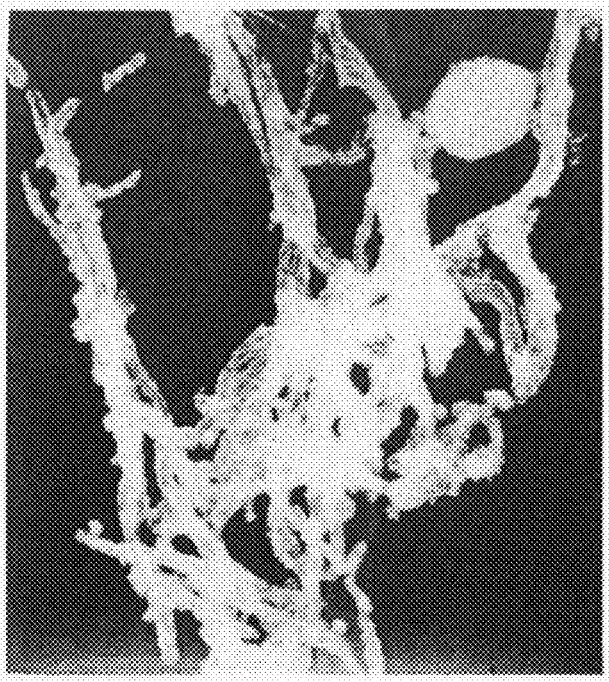
FIG. 2A. Higher magnification TEM image of tubes shown in FIG. 2A, demonstrating particulate nature of the tube coating. Scale bar is 125 nm.
Figure 2B:
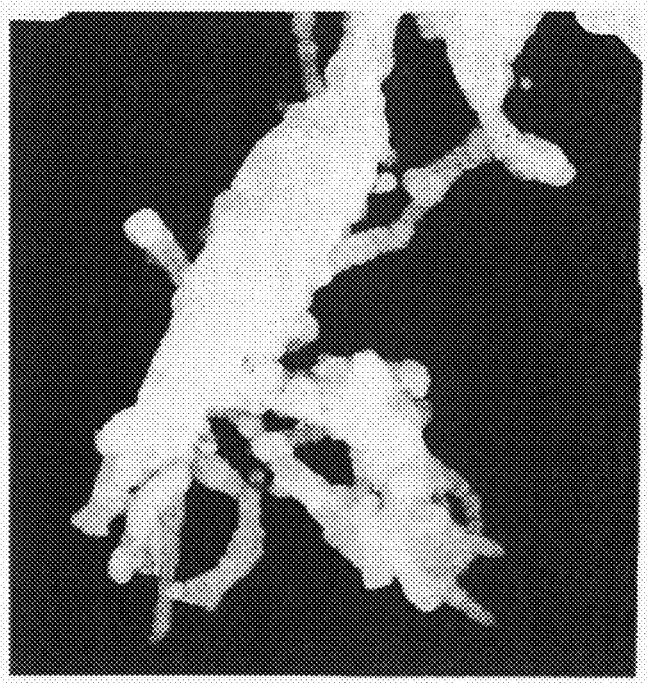
FIG. 2B. Higher magnification image of bundles of thickly coated tubes after ~2 h irradiation time. Scale bar is 500 nm. Note the high electron contrast due to Os.

FIG. 2A is low-resolution TEM images of osmylated tubes that have been UV irradiated for about 90 min. Small grains strung along the nanotube bundles can be observed covering a large proportion of the nanotube sidewalls. In FIG. 2B, with UV irradiation for ~2 h, the coverage is denser and the coating of small individual $OsO_2$ particles is effectively continuous along the sidewalls. Due to the confirmed elemental presence of osmium, all of the electron microscopy images show significantly higher contrast for the functionalized species as compared with the nanotubes themselves.

Figure 3A:
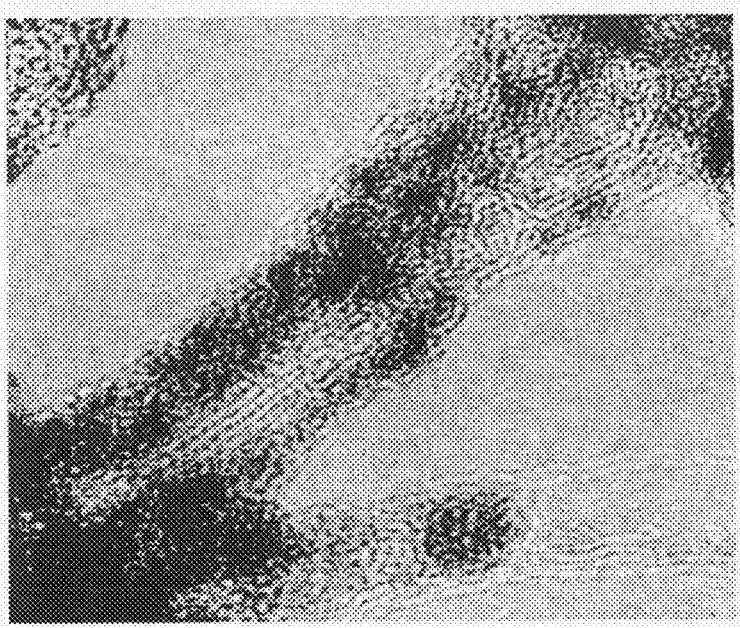
FIG. 3A. High-resolution TEM images of partially coated, metal oxide functionalized tubes. Most of the $OsO_2$ particles are amorphous and are deposited on the sidewalls. Scale bar is 10 nm.
Figure 3B:
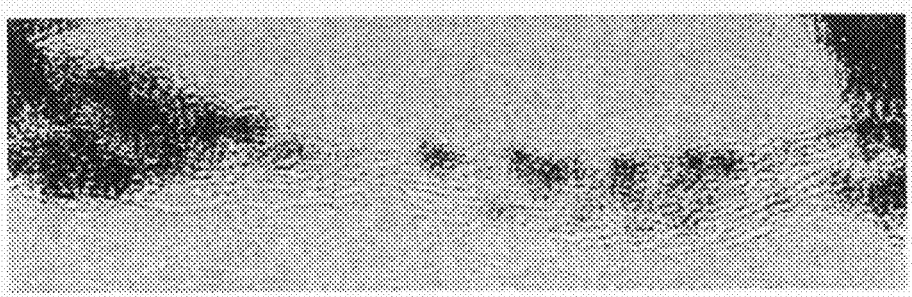
FIG. 3B. High-resolution TEM images of partially coated, metal oxide functionalized tubes. Particles with tiny crystalline cores are visible on the tubes. Scale bar is 20 nm.
Figure 3C:
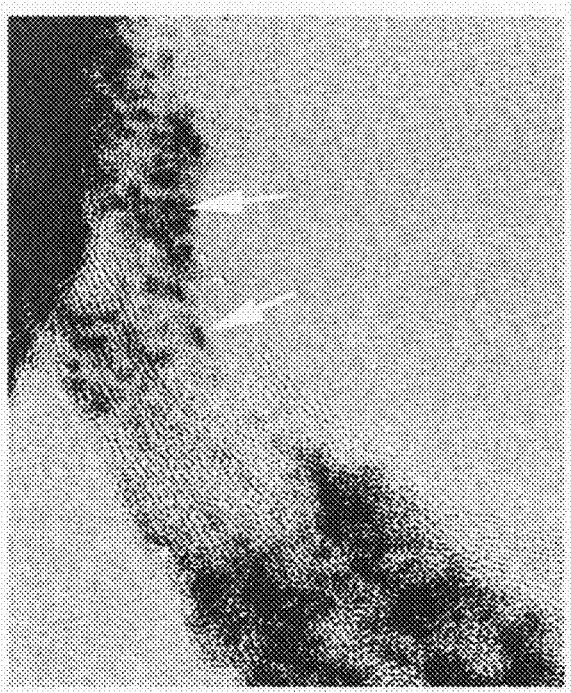
FIG. 3C. High-resolution TEM images of partially coated, metal oxide functionalized tubes. Some functionalized tubes appear to be partially exfoliated from the larger aggregate bundle. Scale bar is 20 nm.
Figure 3D:
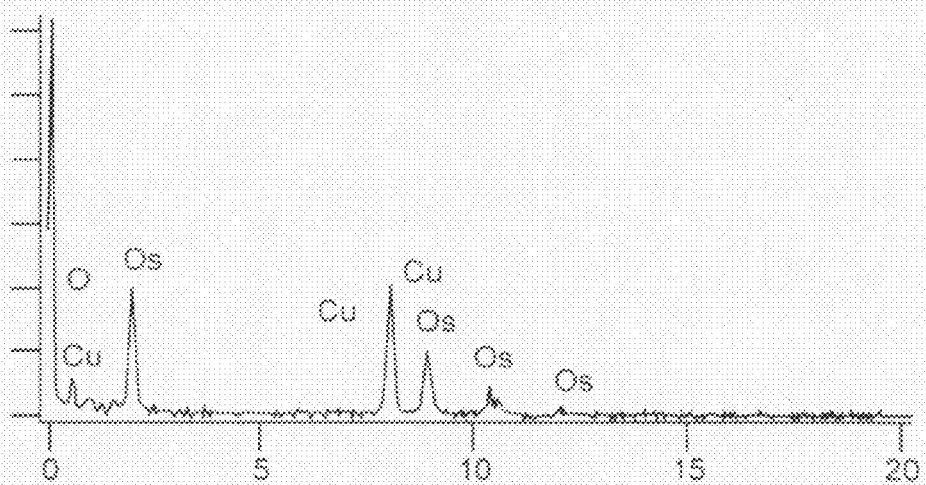
FIG. 3D. EDS spectrum of a typical functionalized nanotube aggregate. Horizontal axis is energy in keV.

FIGS. 3A, 3B and 3C contain high-resolution TEM (HR-TEM) images of the modified nanotubes. The particles are intercalated between the bundles and deposited along the sides of the bundles. Most of the particles are not larger than 2 nm, and some show tiny crystalline cores, while other particles appear amorphous. EDS spectra, shown in FIG. 3D, show the expected Os and O signals for these particles. As is evident in FIG. 3A, the particles are deposited inside bundles as well as coat the outer surfaces of the bundles. FIG. 3B shows deposition of tiny particles with resolvable lattice fringes onto a small bundle of tubes. These $OsO_2$ particles seem to be able to adjoin several tubes and even several bundles of tubes together to form the structures seen in FIG. 1B. It is of note that the oxide is present in an X-ray amorphous form. The few diminutive crystalline cores of these particles, observed in HRTEM, are too small to produce a distinctive X-ray diffraction pattern.

Figure 4A:
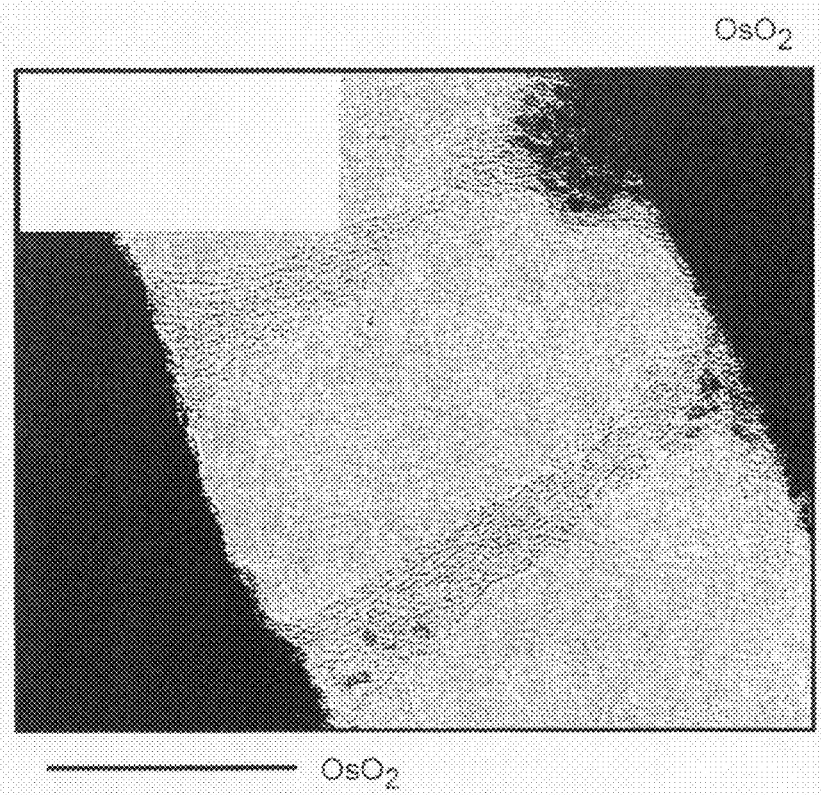
FIG. 4A. High-resolution TEM image of isolated, uncoated tubes, which are delineated by the arrows in FIG. 1, protruding from the thick, aggregated clumps of osmium oxide coating the nanotube structures. SWNT bundles connecting and protruding from two broad $OsO_2$-coated nanotube aggregates. Scale bar is 20 nm.
Figure 4B:
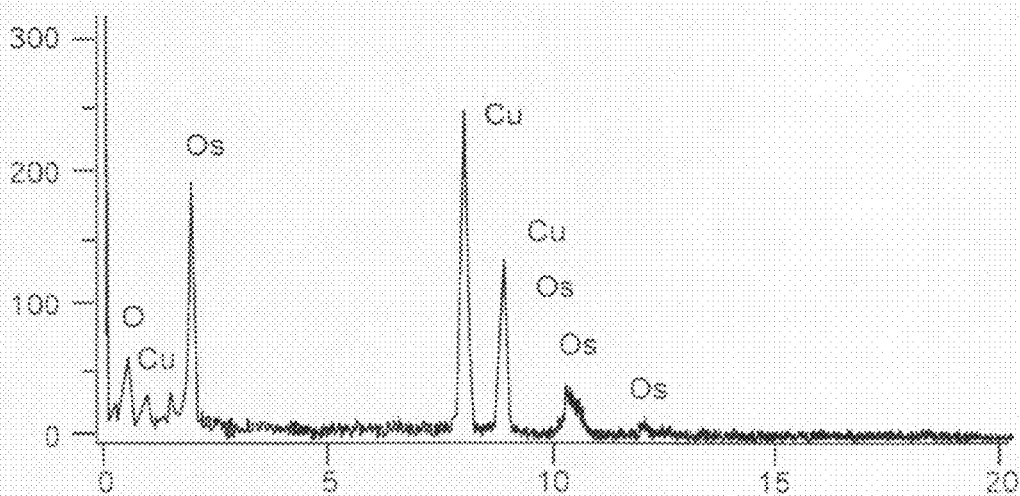
FIG. 4B. EDS spectrum showing the presence of Os. Horizontal axis is energy in keV.

FIG. 4A shows high-resolution TEM images of isolated, uncoated tubes, which had initially been delineated by the arrows in FIG. 1C, protruding from the thick, aggregated clumps of osmium oxide coating the nanotube structures. It is evident from these images that (a) the thickly coated structures, labeled $OsO_2$ in FIG. 4A, consist of multiple bundles of derivatized tubes and that (b) the bridging uncoated tubes, connecting these thickly coated structures, incorporate a number of smaller nanotube bundles, projecting from the larger functionalized aggregates of tubes.

Such coated ropes are similar to previously described $SiO_2$ or SnO coated nanotube structures reported in the literature. (Han et al., *Nano. Lett.*, 2003, 3, 681; Whitsitt et al., *Nano. Lett.* 2003, 3, 775.) However, there is a major difference. In those previous experiments, the oxide particles were preformed by various wet solution routes and allowed to deposit onto the surfaces of nanotubes; the nanotubes did not chemically mediate the nanoparticle formation.

In the present invention, the nanotube itself plays an important chemical role in determining the nature and distribution of osmium oxide particles, which form spontaneously upon UV irradiation.

Figure 5A:
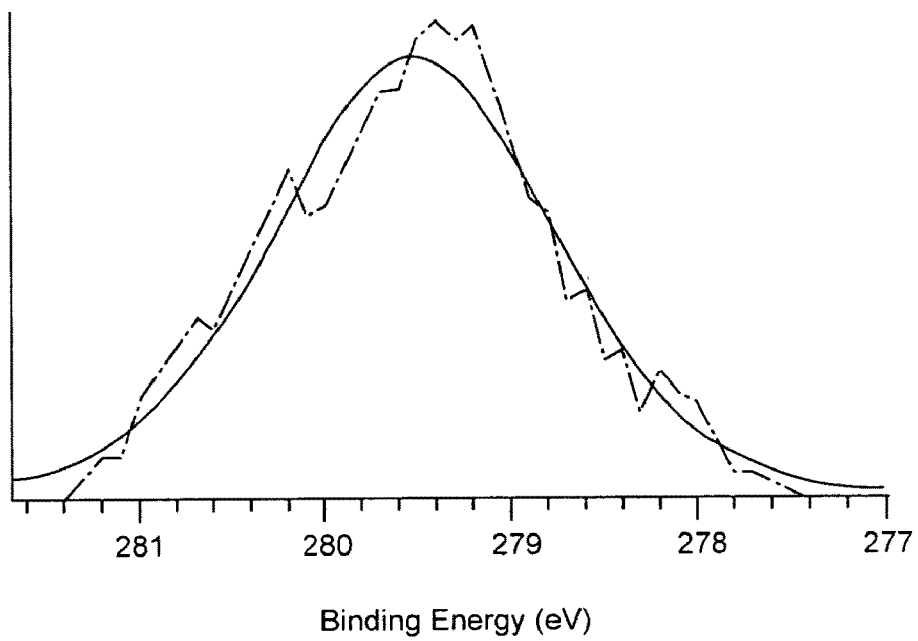
FIG. 5A. High-resolution XPS spectra of functionalized nanotube aggregates (— - —line) as well as the fit (solid line) for the Os $4d$ region. Bottom axis represents binding energy (in eV).
Figure 5B:
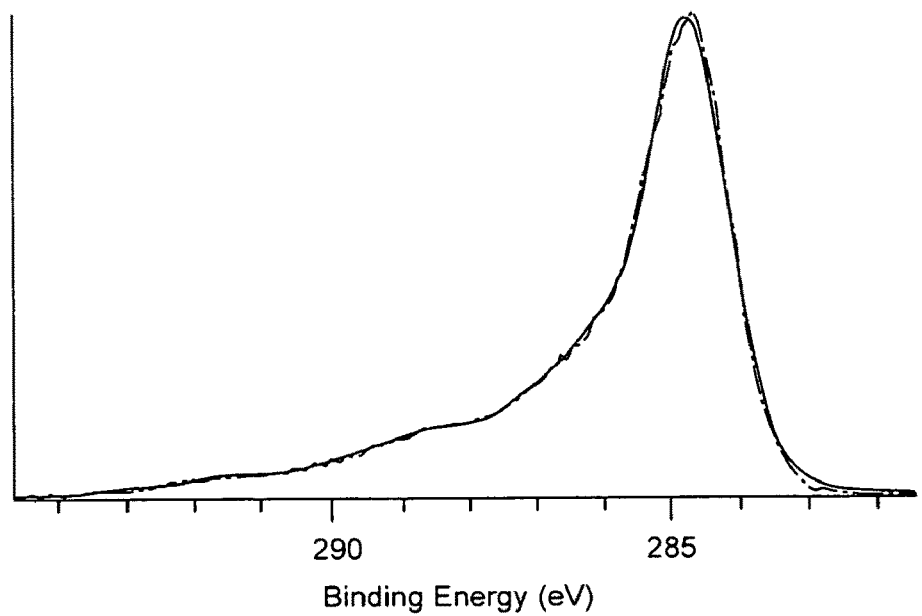
FIG. 5B. High-resolution XPS spectra of functionalized nanotube aggregates (— - —line) as well as the fit (solid line) for the C $1s$ region. Bottom axis represents binding energy (in eV).
Figure 5C:
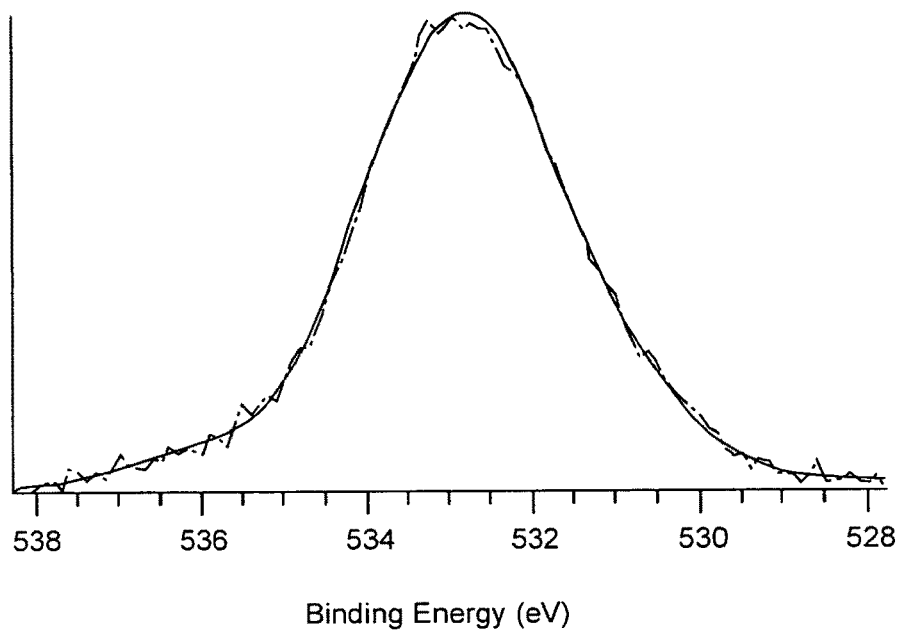
FIG. 5C. High-resolution XPS spectra of functionalized nanotube aggregates (— - —line) as well as the fit (solid line) for the O $1s$ region. Bottom axis represents binding energy (in eV).
Figure 5D:
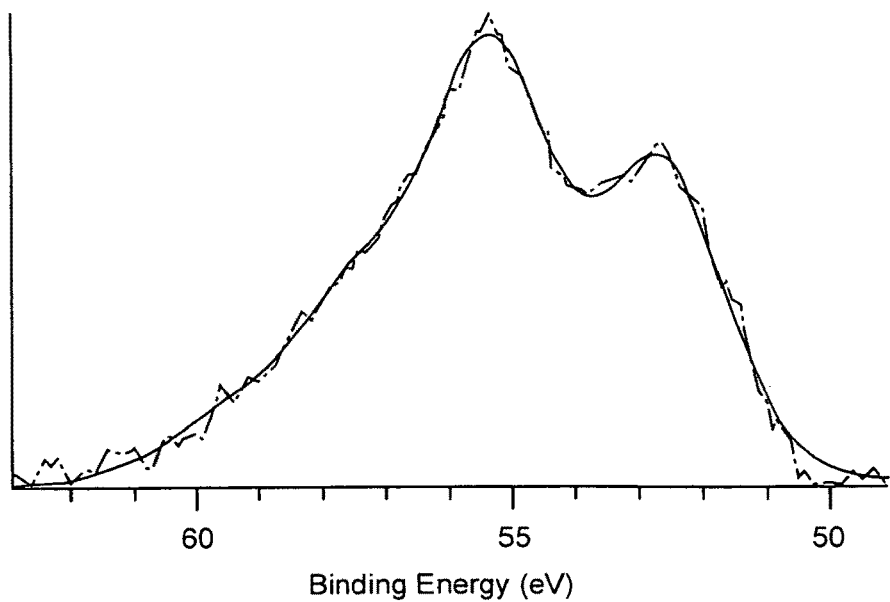
FIG. 5D. High-resolution XPS spectra of functionalized nanotube aggregates (— - —line) as well as the fit (solid line) for the Os $4f$ region. Bottom axis represents binding energy (in eV).

XPS Characterization. High-resolution XPS spectra (FIGS. 5A, 5B, 5C and 5D) of the functionalized tubes identified Os to consist almost exclusively of the nanoparticulate $OsO_2$ form, where the Os metal retains an oxidation state of +4. Since $OsO_2$ itself is conducting (Hayakawa et al., *Thin Solid Films* 1999, 347, 56) no charging neutralization was required for any of the measurements described. The Os 4 $d_{5/2}$ peak could be fit with a single line centered at a binding energy of 279.49 eV (FIG. 5A). This peak is distinct from the C 1 s peak at 284.5 eV (FIG. 5B). In fact, in the C 1 s spectrum, shown in FIG. 5B, the high-energy tail can be fitted to an osmium 4 $d_{3/2}$ peak at 293.12 eV. Moreover, the C 1 s spectrum also shows contributions from oxygenated functionalities, including those introduced during the purification step, as well as those produced by oxidation of the nanotube by $OsO_4$. The Os 4 $f_{7/2}$ and 4 $f_{5/2}$ peaks (FIG. 5D) contain a limited contribution from the Fe 3 $p_{1/2}$ and 3 $p_{3/2}$ peaks, originating from remnant HiPco catalyst. From peak shape analysis, an $OsO_2$ component, composed of contributions at 52.57 and 55.29 eV, could be identified. The assigned values are consistent with those observed in the literature. (Hayakawa et al., *Thin Solid Films* 1999, 347, 56.) The O 1 s spectrum (FIG. 5C) showed contributions from the metal oxide (531 eV) as well as from the oxygenated functional groups on the nanotube.

Raman Discussion: Evidence for Selective Reactivity of Metallic Tubes. Raman spectroscopy is a particularly sensitive probe of electronic and vibrational structure and their coupling in SWNTs. (Dresselhaus et al., *Acc. Chem. Res.* 2002, 35, 1070.) Raman spectra for different sets of carbon nanotubes are resonantly enhanced at selected laser excitation wavelengths due to coupling with the optically allowed electronic transitions between the van Hove singularities in the electronic density of states of the SWNTs. Characteristic features of the Raman spectrum of SWNTs include the diameter-dependent radial breathing modes (RBM). (Yu et al., *Phys. Chem. B.* 2001, 105, 1123.) (150-300 $cm^{-1}$), the tangential mode or G band (~1560-1600 $cm^{-1}$), and the disorder-induced D band (~1290-1320 $cm^{-1}$). Importantly, the shape and intensity of a disorder mode peak have been correlated with the extent of nanotube sidewall functionalization. (Strano et al., *Science* 2003, 301, 1519; Bahr et al., *Chem. Mater.* 2001, 13, 3823.)

Sidewall functionalization is accompanied by the formation of $sp^3$-hybridized carbons on the sidewalls and therefore substantial disruption of electronic structure. This leads to a significant increase in the disorder band and is often used as a probe for site specificity and selectivity of a functionalization reaction. (Bahr et al., *J. Mater. Chem.* 2002, 12, 1952; Banerjee et al, *J. Phys. Chem. B* 2002, 106, 12144; Bahr et al., *Chem. Mater.* 2001, 13, 3823.) In general, though, with increasing extent of sidewall functionalization, as the pseudo one-dimensional lattice becomes increasingly disrupted, the nanotubes are no longer in electronic resonance, and thus, the intensities of all the peaks sharply decrease. (Strano et al., *Science* 2003, 301, 1519.)

Figure 6A:
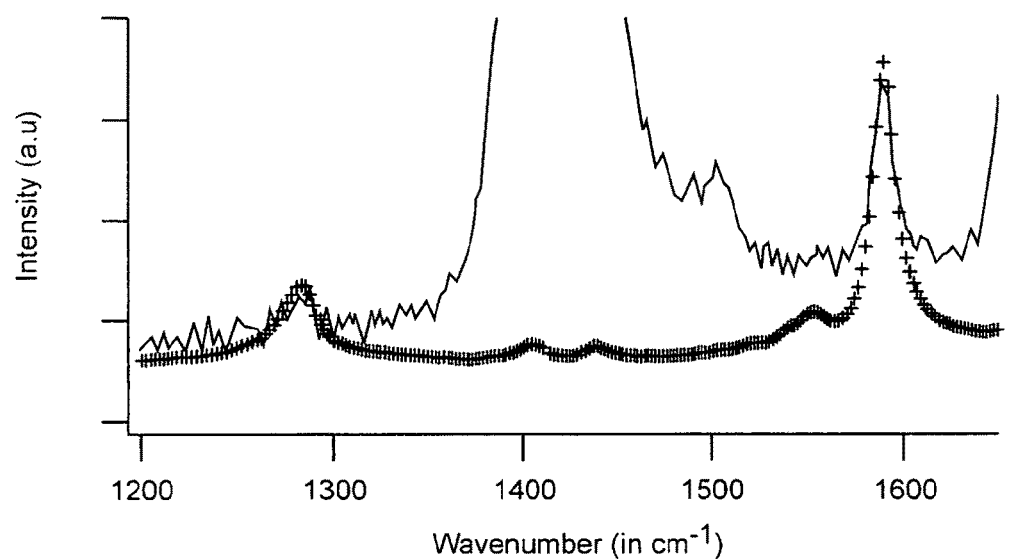
FIG. 6A. FT-Raman spectra of functionalized nanotube aggregates. G and D band regions of purified tubes ("+" line) and $OsO_2$-derivatized tubes (solid line). The large peak in the central region of the spectrum of the functionalized tubes is associated with the DMF solvent. This feature is not as apparent in the spectrum of purified tubes, which may be due to concentration effects.
Figure 6B:
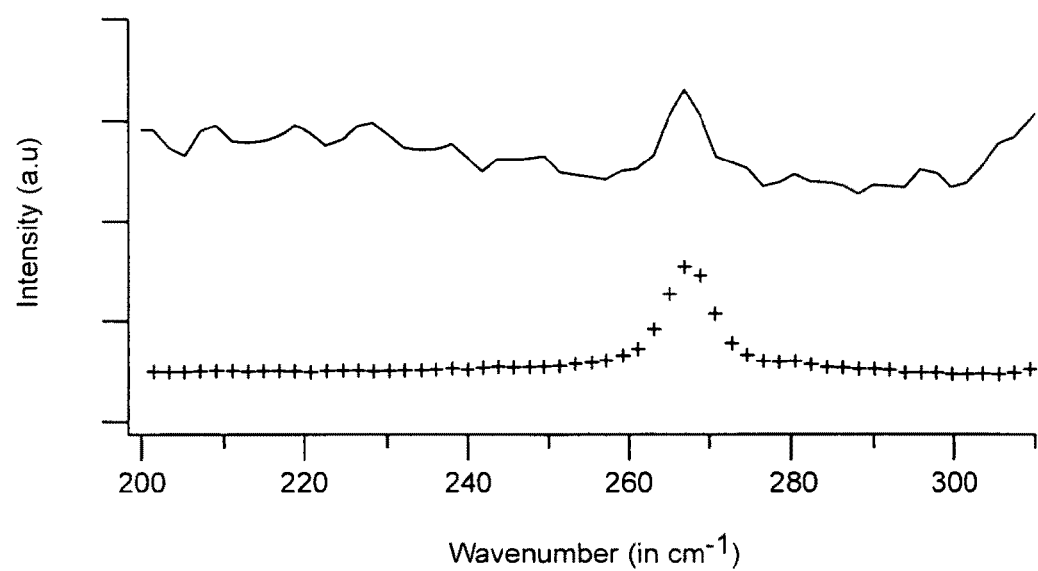
FIG. 6B. FT-Raman spectra of functionalized nanotube aggregates. Radial breathing mode region in the FT spectra of purified tubes ("+" line) and $OsO_2$-derivatized tubes (solid line).

FT-Raman spectra for nanotubes are shown in FIGS. 6A and 6B. The excitation energy dependence of the $I_G/I_D$ ratio has previously been fitted (Kukovecz et al., *Eur. Phys. J B* 2002, 28, 223) to eq 1:

$$I_G/I_D = 10.6 + 0.06 e^{E/0.46} \tag{1}$$

where E is the laser excitation energy in eV.

Thus, at 1064 nm (1.165 eV) laser excitation, this ratio is expected to be low; hence, an increase in the D band intensity upon sidewall functionalization should be clearly apparent. FIG. 6A shows the D and G band regions. At 1064 nm, primarily semiconducting tubes are excited (Kataura et al., *Synth. Met.* 1999, 103, 2555.) and the G band consists of the longitudinal and transversal components of the lattice C-C stretching vibrations of $E_2$, A, and $E_1$ symmetries. It is evident that there is no substantial increase in the relative intensity of the D band upon reaction with $OsO_4$ and that the structural integrity of the sidewalls associated with semiconducting tubes is mainly preserved.

The RBM region shown in FIG. 6B provides further evidence for the presence of SWNTs and their structural integrity in the composite. A single peak at 267 $cm^{-1}$ is noted in the FT-Raman spectra. The RBM frequency is related to the diameter as follows:

$$\omega_{RBM}/cm^{-1} = C_1/d + C_2 \tag{2}$$

Using 239 and 8.5 wavenumbers as values of $C_1$ and $C_2$, based on literature reports of multilaser studies of HiPco tubes (Kukovecz et al., *Eur. Phys. J B* 2002, 28, 223), these calculations would yield relatively small diameter semiconducting tubes with a diameter of ~0.92 nm.

Figure 7A:
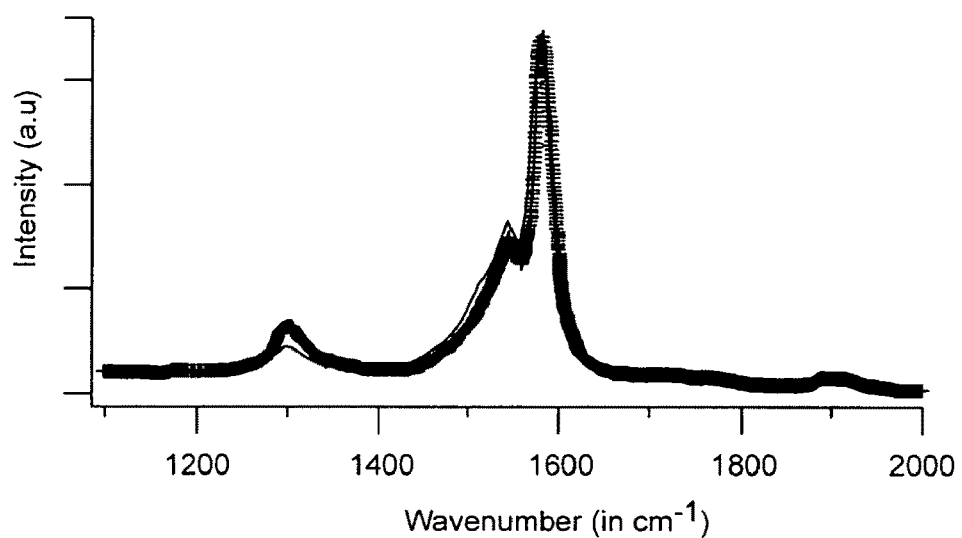
FIG. 7A. Raman spectra collected at 632.8 nm excitation of purified tubes ("+" line) and $OsO_2$-derivatized tubes (solid line) in the G and D band region.
Figure 7B:
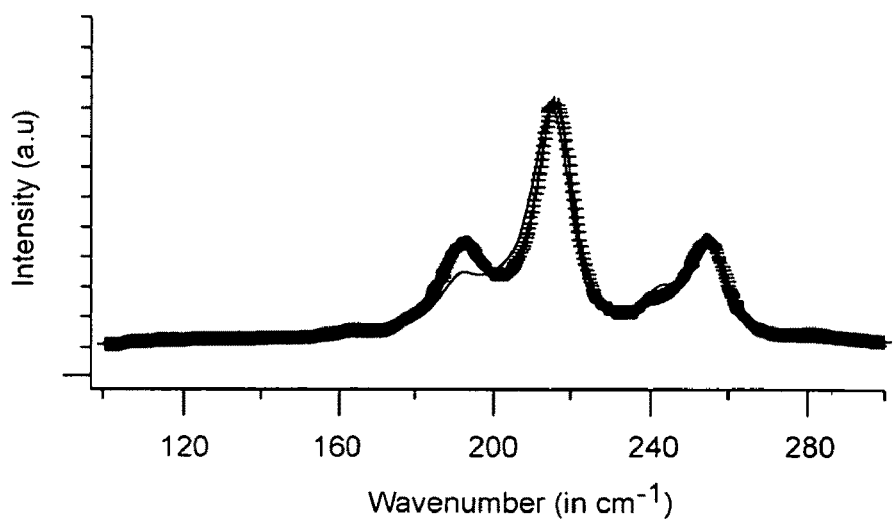
FIG. 7B. Raman spectra collected at 632.8 nm excitation of purified tubes ("+" line) and $OsO_2$-derivatized tubes (solid line) in radial breathing mode region of spectrum with the intensity normalized at 255 $cm^{-1}$.

FIGS. 7A and 7B show the Raman microprobe measurements obtained using He—Ne laser excitation at 632.8 nm (1.96 eV). Compared to the spectra of the purified tubes, the small downshift in the G band position and the attenuation of the D band intensity (FIG. 7A), upon UV irradiation, noted in the spectra of osmylated tubes, can be attributed to the removal of p-doping, as oxygen is desorbed from the nanotubes. (Kavan et al., *J. Phys. Chem. B* 2001, 105, 10764.) At this excitation wavelength, larger diameter metallic and smaller diameter semiconducting tubes are primarily observed. (Strano, M. S. *J. Am. Chem. Soc.* 2003, 125, 16148.) In addition, a G band shoulder corresponding to Breit-Wagner-Fano (BWF) broadened lines, associated with metallic tubes, has started to appear as a low-energy tail. The BWF asymmetric shape is due to the coupling of phonons and electrons in metallic tubes. (Yu et al., *J. Phys. Chem. B* 2001, 105, 1123.) FIG. 7B shows the RBM region for the tubes. For the functionalized, clumped tubes, at least five peaks are clearly resolvable at 192.6, 214.8, 231.8, 254.1, and 280.5 cm$^{-1}$, respectively. These values correspond to larger tubes with diameters of 1.3, 1.16, 1.07, 0.97, and 0.88 nm, respectively.

A few conclusions can be drawn from the Raman studies shown in FIGS. 6 and 7. First, there is no dramatic change of the Raman spectra at laser wavelengths of 632.8 and 1064 nm upon functionalization. This indicates that the structural and electronic integrity of the primarily semiconducting nanotubes being probed is essentially conserved. Second, the most interesting features of the Raman data relate to subtle changes in the RBM profiles, particularly evident at 632.8 nm irradiation.

A decrease in the intensity of the RBM bands has been known to be suggestive of moiety bonding along the sidewalls. (Marcoux et al., *Phys. Chem. Chem. Phys.* 2002, 4, 2278.) In FIG. 7B, upon intensity normalization at 255 cm$^{-1}$, it is apparent that for the functionalized adducts there is a selective reduction in the intensity of the lowest frequency Raman band, corresponding to the larger diameter (~1.3 nm) tubes. That is, the lowest frequency RBM band, which can also be attributed to (13, 4) and (9, 9) metallic tubes, is attenuated with respect to the other bands in the RBM region. Since there was no net loss of tubes from the reaction mixture before and after chemical derivatization, the data suggest that the larger diameter tubes, as opposed to ostensibly more reactive smaller diameter tubes, are more affected by the functionalization process.

One mechanism recently proposed is that these largest tubes, whose intensities are attenuated, are metallic ones, as deduced from a revised Kataura plot. (Strano et al., *J. Am. Chem. Soc.* 2003, 125, 16148; Strano et al., *Science* 2003, 301, 1519; Kataura et al., *Synth. Met.* 1999, 103, 2555). This would be indicative of the selective functionalization of metallic nanotubes over smaller diameter semiconducting nanotubes. Nonetheless, the net result is a loss of resonance enhancement of the Raman spectra for the metallic nanotubes, thereby accounting for the observed attenuation in peak intensity (Bendiab et al., *Phys. Rev. B* 2001, 64, 245424).

Because of the preponderance of OsO$_2$ species observed in the product by XPS analysis, without wanting to be bound by a mechanism, it is believed that the reaction process involves (a) intercalation involving transport of the reactants to the nanotube sidewalls followed by (b) subsequent reduction of OsO$_4$ to OsO$_2$ with a net transfer of electrons from the nanotubes to the Os(VIII) species. It is believed that this net process involves the formation of an intermediate charge-transfer complex with the metallic nanotubes. In general, extraction and transfer of electrons by the formation of a covalent bond has been shown to occur more facilely for metallic tubes rather than for semiconducting tubes. (Strano, M. S. *J. Am. Chem. Soc.* 2003, 125, 16148; Strano et al., *Science* 2003, 301, 1519.) The origin of this selectivity arises from the ease of formation of a charge-transfer complex. To summarize the Raman data, there is an intensity loss in the RBM modes corresponding to the thickest tubes, ruling out RBM band shifting as a likely cause and suggesting that functionalization occurs predominantly with the largest metallic tubes, leaving the semiconducting tubes unaffected.

Figure 8A:
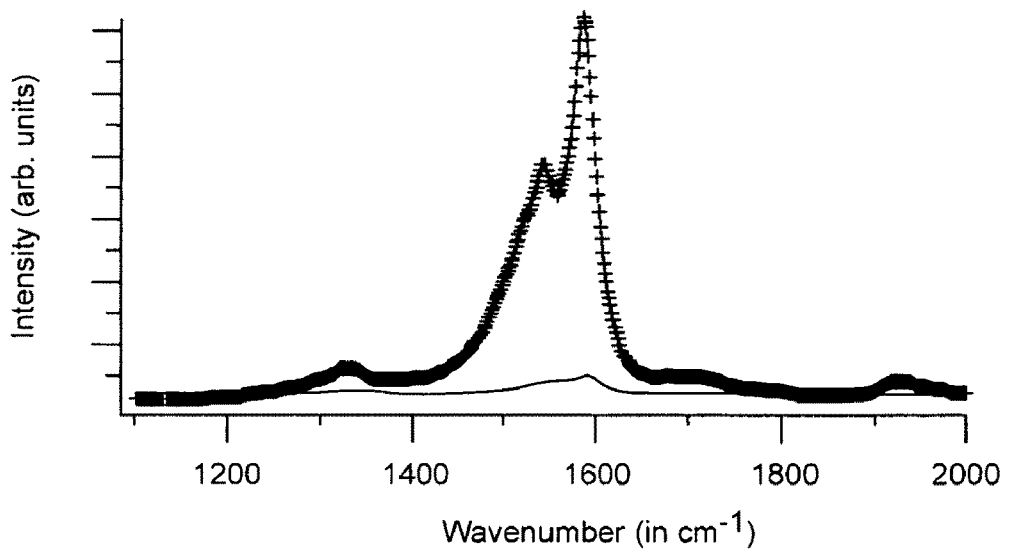
FIG. 8A. Raman spectra collected at 514.5 nm excitation of purified tubes ("+" line) and $OsO_2$-derivatized tubes (solid line)in the G and D band region.
Figure 8B:
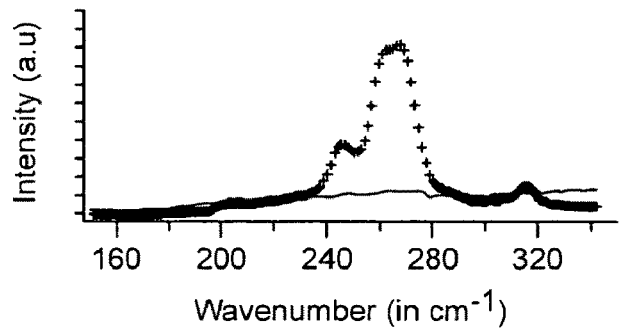
FIG. 8B. Raman spectra collected at 514.5 nm excitation of purified tubes ("+" line) and $OsO_2$-derivatized tubes (solid line). Stokes spectra of radial breathing mode, region of spectrum with the intensity normalized for the background.
Figure 8C:
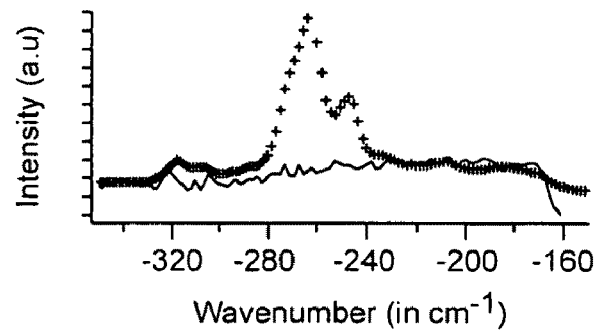
FIG. 8C. Raman spectra collected at 514.5 nm excitation of purified tubes ("+" line) and $OsO_2$-derivatized tubes (solid line). Anti-Stokes spectra of radial breathing mode region.

To further confirm this assertion, namely the high chiral and size selectivity of this chemical reaction, Raman data was obtained at 514.5 nm (2.41 eV) excitation where predominantly smaller-diameter metallic tubes are in resonance (FIGS. 8A, 8B and 8C.) (Chattopadhyay et al., *J. Am. Chem. Soc.* 2003, 125, 3370; Krupke et al., *Science* 2003, 301, 344.) Prominent bands are centered at 245.9, 262.4, 268.0, and 316.3 cm$^{-1}$, which are described in more extensive detail in previous Raman studies at this wavelength (Chattopadhyay et al., *J. Am. Chem. Soc.* 2003, 125, 3370; Strano et al., *Nano Lett.* 2003, 3, 1091). It is evident that the metallic tubes observed in resonance here have higher RBM values than what was observed at 632.8 nm and, hence, are smaller in diameter. On functionalization, the change in intensity is undeniable. The peaks corresponding to derivatized, osmylated nanotubes are greatly reduced in intensity, and most of the RBMs in the Stokes and anti-Stokes have dramatically decayed. On normalization, there is also seen to be an increase in the intensity of the D band relative to the G band of the functionalized tubes. Such a sharp, complete decrease in the resonances for the metallic tubes at 514.5 nm, as compared with the comparatively minimal alterations observed with the peaks of primarily semiconducting tubes at 632.8 nm, provides excellent evidence for the selective functionalization of metallic tubes by osmium tetroxide (Strano, M. S. *J. Am. Chem. Soc.* 2003, 125, 16148; Strano et al., *Science* 2003, 301, 1519).

Thus, this systematic Raman study of nanotube samples at three different excitation wavelengths, probing different electronic populations of tubes, demonstrates the higher reactivity of metallic tubes with respect to osmylation. These observations bear out a theoretical prediction of covalent sidewall osmylation of nanotubes.

Figure 9A:
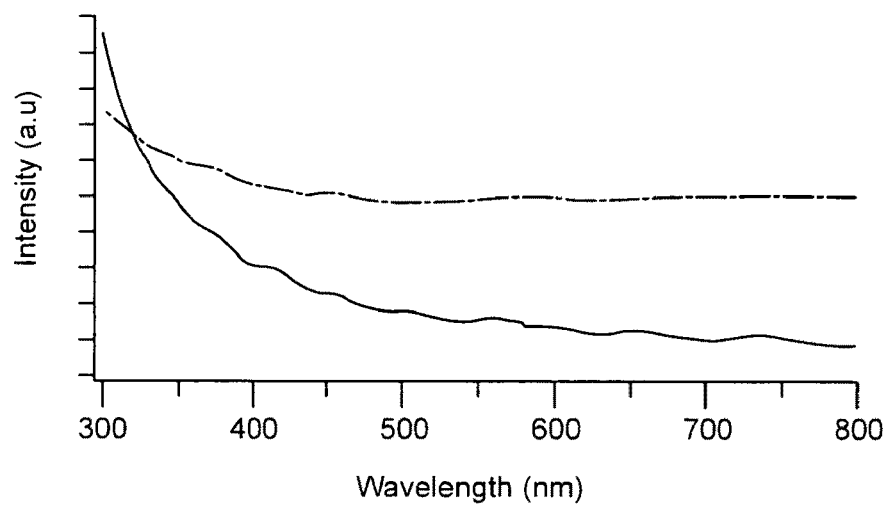
FIG. 9A. UV-visible spectra of unprocessed HiPco SWNTs solid line and of $OsO_2$-functionalized nanotubes ("+" line). The vertical axis is intensity in arbitrary units.
Figure 9B:
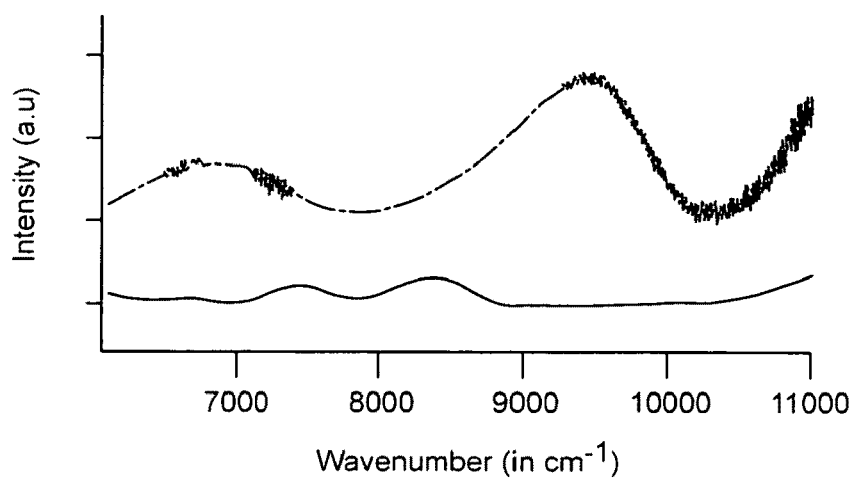
FIG. 9B. Near-IR spectra of purified HiPco (solid line) and of $OsO_2$-functionalized nanotubes ("+" line).

Further Optical Observations. The electronic density of states of SWNTs possesses spike-like features known as van Hove singularities. Optically allowed transitions between these features can be observed in the UV-near-IR spectral region for raw HiPco nanotubes (FIGS. 9A and 9B). (Dresselhaus et al. *Carbon Nanotubes: Synthesis, Structure, Properties, and Applications;* Springer-Verlag: Berlin 2001.) The primary features are transitions between the first pair of singularities ($M_{11}$) in metallic tubes as well as $S_{11}$ and $S_{22}$, the transitions between the first and second pairs of singularities for the semiconducting tubes.

FIG. 9A shows that the osmium dioxide coated adducts do not show the $M_{11}$ transitions and that the optical spectra of the functionalized adduct are mostly featureless in the region of interest. The loss of the UV transitions in the $M_{11}$ region is consistent with the presence of covalent sidewall functionalization disrupting the electronic structure of metallic nanotubes. That is, covalent functionalization, through the mediation of cycloaddition of osmium tetroxide, essentially saturates the bond structure on the nanotube sidewalls, introducing defects that perturb and destroy the periodicity of the intrinsic conjugated sp$^2$-hybridized electronic structure of the nanotube. (Bahr, J.; Tour, J. M. *J. Mater. Chem.* 2002, 12, 1952; Banerjee et al. *J. Phys. Chem. B* 2002, 106, 12144; Kamaras et al., *Science* 2003, 301, 1501.) Indeed, this loss of conjugation could be the primary reason for the decrease in conductivity that has been observed upon the interaction of metallic carbon nanotubes with OsO$_4$ vapor. (Cui et al., *Nano Lett,* 2003, 3, 615.)

FT-near-IR measurements (FIG. 9B) of the functionalized, osmylated nanotubes show peaks near the 0.9 eV region, corresponding to transitions between the first set of singularities in the semiconducting tubes. The transitions of the functionalized tubes are shifted from those of the purified tubes, likely due to a change in tube bundling characteristics upon reaction and to the presence of a thick OsO$_2$ coating on the tubes. Thus far, the following has not been fully ruled out: the interaction of nanotubes with OsO$_4$ as a potential noncovalent doping process of nanotubes in analogy to p-doping of nanotubes by $FeCl_3$ intercalation, which tends to preferentially affect the larger tubes due to their wider intertube channels and which would have shifted the Fermi level of the nanotube, thereby rendering certain transitions as optically forbidden. (Duclaux, L., Carbon 2002, 40, 1751; Pichler et al., Synth. Met. 2003, 135-136, 717; Kukovecz et al., Phys. Chem. Chem. Phys. 2003, 5, 582; Kukovecz et al., Chem. Commun. 2002, 1730; Rao, A. M.; Eklund, P. C.; Bandow, S.; Thess, A.; Smalley, R. E. Nature 1997, 388, 257; Rao, A. M; Bandow, S.; Richter, E.; Eklund, P. C. Thin Solid Films 1998, 331, 141.) Indeed, noncovalent doping interactions can account for the observed bleaching of optical transitions and loss of Raman resonance features. However, doping interactions tend to bleach band-gap transitions in order of increasing energy. (Kavan et al., J. Phys. Chem. B 2001, 105, 10764; Kamaras et al., Science 2003, 301, 1501; Petit et al., Chem. Phys, Lett. 1999, 305, 370.)

It is evident from FIG. 9 that for the functionalized osmylated tubes, the lower energy $S_{11}$ transitions at ~0.9 eV have been retained but the higher energy $M_{11}$ transitions have been lost. So a doping mechanism certainly cannot be an adequate explanation. Rather, these observations coupled together with the observed greater loss of Raman resonance for metallic nanotubes, as compared with the mainly unaffected semiconducting transitions, further support the case that the loss of UV-visible-near-infrared optical transitions likely arises from selective covalent sidewall functionalization of primarily metallic nanotubes. (Strano, M. S. J. Am. Chem. Soc. 2003, 125, 16148; Strano et al., Science 2003, 301, 1519.) It is of note that reactions at ends and defect sites alone cannot account for the dramatic decay of Raman resonances and loss of band-gap transitions noted here, providing further evidence that the reaction likely occurs on the metallic nanotube sidewalls.

Mechanistic Insights into Nanotube Osmylation: Formation of Charge-Transfer Complex. An important point to mention is that UV irradiation is absolutely critical to the formation of the structures presented in FIGS. 1-4. When the experimental protocol, for instance, was carried out in the absence of UV irradiation, none of the thickly coated ropes, characteristic of a typical reaction, were observed. In addition, these processed nanotubes retained the optical transitions between the van Hove singularities.

Furthermore, another control experiment was carried out in the presence of base (i.e., pyridine) but without UV irradiation. After a few days of stirring, the resulting tubes appeared remarkably clean. Though a very low density of osmium clusters, from EDS measurements, was observable on the nanotube surface, the expected optical features of the nanotubes were retained, implying a lack of alteration in the intrinsic electronic structure of the tubes. Also, none of the unique morphological structures, apparent in FIGS. 1-4, were observed. XPS analysis identified the oxidation states of the osmium in the complexes observed in this control experiment as consisting of a mixture of +8, +6, and +4.

To better understand the nature of the osmylation reaction with nanotubes and the necessity of UV irradiation, a potential reaction mechanism in relation to analogous charge-transfer (CT) osmylation reactions of benzenoid hydrocarbons is discussed here. (Wallis et al., J. Org. Chem. 1988, 53, 1679; Wallis et al., J. Am. Chem. Soc. 1988, 110, 8207.) The reaction mechanisms for these reactions are not exactly identical. For instance, whereas solutions of complexes of $OsO_4$ and most aromatic donors possess characteristic CT absorption bands, it is difficult to observe a distinctive charge-transfer band in the heterogeneous nanotube reaction mixture of the present invention.

In the present invention, the mixture is photochemically excited at 254 nm, corresponding to the $A_1 \rightarrow T_2$ ($3t_2 \rightarrow 2e$) transition, the second dipole-allowed transition in $OsO_4$. (Roebber et al., J. Chem. Phys. 1974, 60, 3166.) When $OsO_4$ is activated from the ground to the excited $T_2$ state, it becomes a much better oxidizing agent and can more readily accept electrons. Osmium tetroxide is a versatile electron acceptor with alkenes and arenas. Without wanting to be bound by a mechanism, it is believed that the first step of the reaction process of the present invention involves the formation of an electron donor-acceptor (EDA) complex with the nanotube. (Wallis et al., J. Am. Chem. Soc. 1988, 110, 8207.) These types of complexes with most arenes are weak and can easily dissociate. A reasonable structure for the analogous short-lived ion pair state involving the nanotube is shown in eq 3.

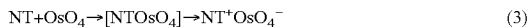

$$NT+OsO_4 \rightarrow [NTOsO_4] \rightarrow NT^+OsO_4^- \qquad (3)$$

The formation of this intimate ion pair necessitates a loss of electrons from the nanotube, thereby depleting the valence band states. An important measure of the ability of any molecule or molecular entity to give up electrons is its ionization potential. With benzenoid hydrocarbons, the formation of arene cations occurs with arenes, possessing ionization potentials of up to 9.23 eV (benzene). A particularly stable cation is formed with the electron-rich 9,10-dimethylanthracene with an ionization potential of 7.11 eV. (Masnovi et al., J. Chem. 1984, 62, 2252.) By comparison with these arenes, the ionization potential of (5, 5) SWNTs is estimated to be much more favorable at 6.4 eV and can be further reduced upon water adsorption. (Maiti et al., Phys. Rev. Lett. 2001, 87, 155502.) Ionization potentials for (4, 4) SWNTs were found to be about 6.0 eV. (Hou et al., Chem. Phys. Lett. 2003, 373, 308.) Thus, as compared with arenes, it should be relatively facile for nanotubes to give up electrons to an excited $OsO_4$.

The facility of formation of the charge-transfer complex involving the nanotube and the extent of electron transfer from the nanotube surface to the osmium tetroxide species are expected to be highly dependent on the electron density near the Fermi level. (Strano, M. S. J. Am. Chem. Soc. 2003, 125, 16148; Strano et al., Science 2003, 301, 1519.) Thus, metallic and semimetallic nanotubes, as compared with semiconducting tubes, are expected to have a higher reactivity toward and a greater ability to reduce an excited $OsO_4$. Hence, the electronic density of states of the nanotubes is capable of influencing the relative reactivity of metallic and semiconducting nanotubes by preferentially stabilizing the transition state shown in eq 3.

Control experiments, run in the absence of nanotubes from the reaction mixture, indicated a lack of deposition of $OsO_2$ precipitate even after more than 2 h of UV irradiation. Moreover, the structures, seen in FIGS. 1-4, are not observed if toluene is substituted by the base, pyridine, in the reaction mixture. This observation is consistent with the proposed formation of an EDA complex (eq 3), as preferential coordination of the Lewis base pyridine with the electron acceptor (K~48 $M^{-1}$) would have disrupted the EDA complex. (Wallis et al., J. Am. Chem. Soc. 1988, 110, 8207.) This is an important difference from a theoretical prediction of osmate ester formation, which postulates a straightforward [2+3] cycloaddition reaction. (Lu et al., Nano Lett. 2002, 2, 1325.) Rather, experimental nanotube osmylation is far more analogous to a photoactivated charge-transfer process, observed previously for benzenoid hydrocarbons. (Wallis et al., J. Org. Chem, 1988, 53, 1679; Wallis et al., *J. Am. Chem. Soc.* 1988, 110, 8207.) The absolute requirement for UV irradiation in this reaction underscores the importance of the initial formation of the EDA charge-transfer complex.

Ion pairs with arenes will spontaneously collapse and undergo cycloaddition. (Wallis et al., *J. Org. Chem,* 1988, 53, 1679; Wallis et al., *J. Am. Chem. Soc.* 1988, 110, 8207.) By analogy, for nanotubes, the intermediate transition state, strongly stabilized in the case of metallic tubes by electron donation, will be similarly subjected to covalent cycloaddition from osmium tetroxide. The introduction of covalent bonds on a nanotube surface increases the reactivity of adjacent carbons. An analogous reaction mechanism involving the loss of electrons from metallic tubes through the formation of a covalent bond has been proposed for the functionalization of nanotubes with diazonium salts. (Strano, M. S. *J. Am. Chem. Soc.* 2003, 125, 16148.)

To illustrate the viability of the mechanistic possibility of charge transfer with nanotubes, charge-transfer osmylation of anthracene in nonpolar solvents can lead to the oxidation of anthracene to anthraquinone and the subsequent generation of $OsO_2$. (Wallis et al., *J. Am. Chem. Soc.* 1988, 110, 8207.)

By analogy, a very similar type of reaction occurs with metallic nanotubes. The coordinately unsaturated $OsO_2$, precipitated out, can then self-aggregate to form the thick coating observed on the tubes (FIGS. 1-4).

The invention claimed is:

1. A method of aggregating carbon nanotubes, the method comprising:
    (a) providing a nanotube dispersion, wherein the nanotube dispersion comprises a plurality of carbon nanotubes, osmium tetroxide and a solvent; and
    (b) irradiating the nanotube dispersion with ultraviolet light until the carbon nanotubes aggregate, wherein the metallic carbon nanotubes are selectively osmylated.

2. A method of aggregating carbon nanotubes, the method comprising:
    (a) providing a nanotube dispersion, wherein the nanotube dispersion comprises a plurality of carbon nanotubes, ruthenium tetroxide and a solvent; and
    (b) irradiating the nanotube dispersion with ultraviolet light until the carbon nanotubes aggregate, wherein the metallic carbon nanotubes are selectively ruthenylated.

3. A method of separating metallic carbon nanotubes from semiconducting carbon nanotubes based on density, the method comprising:
    (a) providing a nanotube dispersion, wherein the nanotube dispersion comprises a plurality of metallic and semiconducting carbon nanotubes, osmium tetroxide and a solvent;
    (b) irradiating the nanotube dispersion with ultraviolet light, wherein the metallic carbon nanotubes are osmylated thereby differentiating the metallic carbon nanotubes from the semiconducting carbon nanotubes; and
    (c) separating the metallic carbon nanotubes from the semiconducting carbon nanotubes based on density.

4. The method according to claim 3 further comprising individualizing the plurality of nanotubes before providing the nanotube dispersion.

5. The method according to claim 3 wherein the wavelength of the ultraviolet light is between approximately 100 to 400nm.

6. The method according to claim 3 wherein the time for irradiation is at least about five minutes.

7. The method according to claim 3 wherein irradiating the nanotube dispersion is continued until the carbon nanotubes aggregate.

8. The method according to claim 3 wherein the ratio by weight of the osmium tetroxide to the nanotubes is at least about 3:1.

9. A method of separating metallic carbon nanotubes from semiconducting carbon nanotubes based on density, the method comprising:
    (a) providing a nanotube dispersion, wherein the nanotube dispersion comprises a plurality of metallic and semiconducting carbon nanotubes, ruthenium tetroxide and a solvent;
    (b) irradiating the nanotube dispersion with ultraviolet light, wherein the metallic carbon nanotubes are ruthenylated thereby differentiating the metallic carbon nanotubes from the semiconducting carbon nanotubes; and
    (c) separating the metallic carbon nanotubes from the semiconducting carbon nanotubes based on density.

10. The method according to claim 9 further comprising individualizing the plurality of nanotubes before providing the nanotube dispersion.

11. The method according to claim 9 wherein the wavelength of the ultraviolet light is between approximately 100 to 400nm.

12. The method according to claim 9 wherein the time for irradiation is at least about five minutes.

13. The method according to claim 9 wherein irradiating the nanotube dispersion is continued until the carbon nanotubes aggregate.

14. The method according to claim 9 wherein the ratio by weight of the ruthenium tetroxide to the nanotubes is at least about 3:1.

15. The method according to claim 3, wherein the solvent is a nonpolar solvent.

16. The method according to claim 9, wherein the solvent is a nonpolar solvent.

* * * * *